Figure 1:
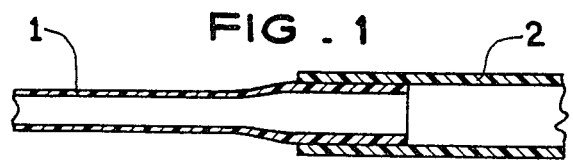

United States Patent
Pontigny

[11] 3,926,459
[45] Dec. 16, 1975

[54] DILATABLE TUBE, METHOD FOR ITS PRODUCTION AND APPLICATIONS THEREOF

[76] Inventor: Jacques Pontigny, 14, Rue E. Legendre, 95 Margency, France

[22] Filed: Dec. 13, 1973

[21] Appl. No.: 426,723

[30] Foreign Application Priority Data
Dec. 22, 1972  France .............. 72.46071

[52] U.S. Cl. .............................. 285/381
[51] Int. Cl.² .......................... F16L 47/00
[58] Field of Search ............ 285/381, DIG. 10, 260, 285/423, DIG. 12, 173, 369, 334.5, 374; 156/86

[56] References Cited
UNITED STATES PATENTS

| | | | |
|---|---|---|---|
| 2,027,962 | 1/1936 | Currie | 285/423 X |
| 3,080,183 | 3/1963 | Luertzing et al. | 285/381 X |
| 3,217,400 | 11/1965 | Illesy et al. | 285/260 X |
| 3,382,121 | 5/1968 | Sherlock | 285/381 X |
| 3,388,931 | 6/1968 | Johnson et al. | 285/381 X |
| 3,476,413 | 11/1969 | Coberly et al. | 285/381 X |
| 3,513,429 | 5/1970 | Helsop | 285/381 X |
| 3,579,805 | 5/1971 | Kast | 285/381 X |

FOREIGN PATENTS OR APPLICATIONS

| | | | |
|---|---|---|---|
| 206,537 | 12/1967 | U.S.S.R. | 285/381 |
| 903,757 | 8/1962 | United Kingdom | 285/381 |

*Primary Examiner*—Werner H. Schroeder
*Assistant Examiner*—Peter Nerbun
*Attorney, Agent, or Firm*—Oldham & Oldham Co.

[57] ABSTRACT

The present invention concerns a tube in a thermoplastic material which expands under the action of heat and conserves its dilated form after cooling.

It can be obtained by stretching when hot a tube in a thermoplastic material having an elastic memory activable above the ambient temperature, so as to reduce its diameter, followed by cooling of the tube so stretched.

9 Claims, 4 Drawing Figures

DILATABLE TUBE, METHOD FOR ITS PRODUCTION AND APPLICATIONS THEREOF

The present invention concerns a tube composed of a thermoplastic material, a method for its production and applications thereof particularly to the realization of junctions.

The tube composed of a thermoplastic material according to the present invention is determined by the fact that it expands under heat and retains its dilated form after cooling.

The Applicant has discovered that it is possible to obtain nsuch a tube by stretching when heated a tube composed of a thermoplastic material having an elastic memory activable above the ambient temperature, so as to reduce its diameter, followed by a cooling of the tube thus stretched.

For a long time, one knows thermoplastic materials having an elastic memory. Such materials are described in particular in U.S. Pat. No. 2,981,668. These materials can be obtained by reticulation of a polymer or a copolymer under the action of a beam of high energy electrons.

As polymers or copolymers one uses advantageously in the present invention olefin polymers such as polyethylene, fluorinated olefin polymers such as polytetrafluoroethylene, polyvinylidene fluoride or a fluorinated ethylene/propylene copolymer and silicon rubbers.

The stretching of the tube can be such that the reduction of its diameter is about 50%. It is however possible to use greater diameter reductions.

Further it is possible to use tubes which have previously expanded and which are commercially available. In this case it is necessary to stretch the tube with greater forces in order to reduce its diameter below the relaxation diameter.

The tube according to the present invention, permits the easy realization of a junction with any element which surrounds part of the tube. It is necessary to raise the temperature of the part of the tube inserted in the said element to a temperature at least equal to the memory activation temperature. to obtain a permanent junction between the tube and the surrounding element sufficiently resistant to separation forces, a tube with an appropriated diameter should be used, which has been stretched so that it applies, after expansion, a pressure, assuring a good joint between the tube and the element.

The tube according to the invention can be used, in particular to make junctions with other tubes, with couplings or with perforated plates.

On the attached drawing various junctions which can be obtained according to the present invention are shown.

In FIG. 1 is shown a junction between a tube 1 according to the present invention and any heat resistant tube 2. In order to make this junction it is sufficient to heat the extremity of the tube 2 to such a temperature that the extremity of the tube 1 introduced in the tube 2 is heated to a temperature at least equal to the memory activation temperature.

Figure 2:

A junction between two tubes according to the invention, is shown in FIG. 2. This junction is make as follows. A tube 3 according to the invention is introduced into a tube 4 identical to the tube 3 but where the extremity has previously been heated to a temperature at least equal to the memory activation temperature and has thus been expanded. The parts which overlap are then heated so that the tube 3 expands and exerts a pressure on the tube 4.

Such a junction is very interesting. On one hand it permits two tubes of the same diameter to be joined together without the use of an intermediary joining element. On the other hand it assures the joining of two tubes without any shrinking of the internal diameter of the joint.

Figure 3:
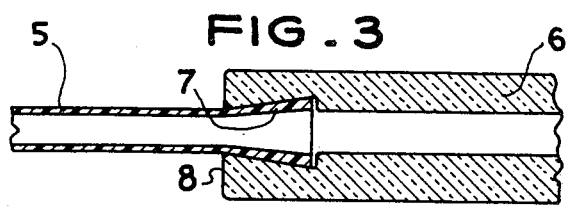

A junction according to the invention between a tube 5 and a glass tube 6 is shown in FIG. 3. The glass tube is provided at its extremity with a hollow 7 in the shape of a truncated cone, the diameter of which decreases towards the extremity of the tube 8. When one heats the extreme part of the glass tube in which one has introduced a tube according to the invention, the tube according to the invention takes the form of the hollow 7.

This is also an interesting junction as it permits a joining between a glass tube and a tube of a thermoplastic material, withstands high tensile stress.

Figure 4:
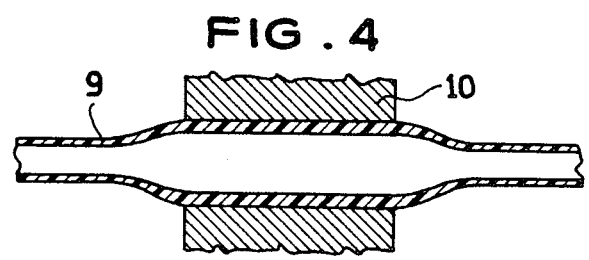

In FIG. 4 is shown a junction between a tube, according to the invention, 9 and a metal plate 10. In this case the heating of the tube according to the invention can be indirectly assured by induction heating. One thereby assures the heating of the tube only on the area which is inserted in the metal plate.

When one replaces the metal plate by a metallic coupling or an element comprising a metal part surrounding the tube, it is also possible to use this kind of heating.

In the case of perforated metal plates, this type of junction permits the realization of connection plates between tubes. It is just necessary to fix for a perforated metal plate a certain number of tubes which protrude from the both sides of the plate on a suitable length (for example on a length of about 1 cm) thus obtaining a connection plate which can be used for detachable or permanent junctions. In the latter case it is sufficient to heat the end of the tubes in order to expand them and assure a junction as shown in FIG. 1.

In the case of the couplings, this type of joint permits final stops on the tubes, in particular near the extremities of the tubes to be inserted in other tubes.

Generally the different types of junctions described find applications in the assembly of the medical or chemical analysers.

While several complete embodiments of the invention have been disclosed herein, it will be appreciated that modification of these particular embodiments of the invention may be resorted to without departing from the scope of the invention.

Having now described my invention, what I claim as new and desire to secure by Letters Patent is:

1. Process for the realization of a junction between a thermoplastic tube and an element surrounding a part of this tube comprising irradiating the tube with electrons to yield a tube having elastic memory, heating the tube and stretching it along its entire length so as to reduce its diameter by 50% or more, cooling the tube thus stretched, inserting the tube into said surrounding element following by heating the tube to its memory activation temperature to bring about its expansion and securement with the surrounding element.

2. Process according to claim 1, in which the element surrounding a part of tube is the extremity of another tube.

3. Process according to claim 2, in which the two tubes are identical, the extremity of the receiving tube having previously been heated to a temperature at least equal to the memory activation temperature.

4. Process according to claim 2, in which the second tube is a glass tube provided at its extremity with a hollow in the shape of a truncated cone, the diameter of which decreases towards the extremity of the glass tube.

5. Process according to claim 1, in which the element surrounding the tube contains at least a metallic part and the metallic part is heated by induction.

6. A junction betwen a tube and an element surrounding a part of the tube comprising a thermoplastic tube having an elastic memory caused by an irradiation of it with electrons, said memory being activable above a certain ambient temperature, substantially the entire length of said tube being stretched subsequent to having been heated so as to reduce its diameter by at least 50% from its memory state one of the tube's end portions being located withitn said surrounding element and being expanded to a diameter that corresponds to its memory state.

7. A method of forming a junction between a connection plate and a tube inserted within said plate comprising irradiating the tube with electrons to yield a tube having elastic memory, heating the tube and stretching it along its entire length so as to reduce its diameter by 50% or more, cooling the tube thus stretched, inserting the tube into the hole within said connection plate so that both ends of said tube project from said plate, heating the tube to its memory activation temperature to bring about its expansion and securement with said connection plate hole.

8. A method as in claim 7 and including stretching the tube to obtain a reduction of its diameter of at least about 50%, and wherein one tube end protrudes only a short distance from the plate.

9. A method as in claim 8 and wherein the stretched tube is heated only in the area thereof inserted in the plate.

* * * * *